US009013427B2

(12) United States Patent
Li et al.

(10) Patent No.: US 9,013,427 B2
(45) Date of Patent: Apr. 21, 2015

(54) METHOD AND TERMINAL OF DISPLAYING CONTACT LIST (75) Inventors: Rui Li, Nanjing (CN); Yong Liu, Nanjing (CN); Yufeng Xu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 13/592,106

(22) Filed: Aug. 22, 2012

(65) Prior Publication Data
US 2013/0027335 A1 Jan. 31, 2013

Related U.S. Application Data (63) Continuation of application No. PCT/CN2012/070870, filed on Feb. 3, 2012.

(30) Foreign Application Priority Data

Jul. 29, 2011 (CN) .......................... 2011 1 0215318

(51) Int. Cl.
G06F 3/041 (2006.01)
G06F 3/042 (2006.01)
A63F 9/24 (2006.01)
H04M 1/2745 (2006.01)
G06F 3/0482 (2013.01)
G06F 3/0488 (2013.01)

(52) U.S. Cl.
CPC ...... *H04M 1/27455* (2013.01); *H04M 2250/22* (2013.01); *G06F 3/0482* (2013.01); *H04M 1/274583* (2013.01); *G06F 3/04886* (2013.01)

(58) Field of Classification Search
USPC ................................ 345/440, 173
See application file for complete search history.

(56) References Cited

U.S. PATENT DOCUMENTS

| 7,375,730 B2 | 5/2008 | Tagliabue et al. |
| 7,424,683 B2 | 9/2008 | Van Leeuwen |
| 8,711,102 B2 * | 4/2014 | Kong et al. ................... 345/173 |

(Continued)

FOREIGN PATENT DOCUMENTS

| CN | 1601916 A | 3/2005 |
| CN | 1988564 A | 6/2007 |

(Continued)

OTHER PUBLICATIONS

International Search Report issued in corresponding PCT Patent Application No. PCT/CN2012/070870, mailed May 10, 2012.

(Continued)

*Primary Examiner* — Kumar Patel
*Assistant Examiner* — Kuo Woo
(74) *Attorney, Agent, or Firm* — Brinks Gilson & Lione (57) ABSTRACT The present disclosure relates to communication technologies and discloses a method and terminal of displaying a contact list. The method of displaying a contact list is applied on an apparatus with a touch sensitive display, comprising: detecting a touch on the touch sensitive display, after receiving an instruction for opening a contact list; determining a touch position, when detecting the touch on the touch sensitive display; and determining a large contact group corresponding to the touch position, and displaying contacts in the large contact group by the touch sensitive display. With the present disclosure, a user can find out a contact quickly, and the user's experience can be improved.

4 Claims, 4 Drawing Sheets (56) References Cited

U.S. PATENT DOCUMENTS

| | | | |
|---|---|---|---|
| 2004/0212617 A1* | 10/2004 | Fitzmaurice et al. | 345/440 |
| 2006/0035632 A1 | 2/2006 | Sorvari et al. | |
| 2007/0132789 A1 | 6/2007 | Ording et al. | |
| 2008/0059627 A1 | 3/2008 | Hamalainen et al. | |
| 2010/0241985 A1 | 9/2010 | Kim et al. | |
| 2011/0045850 A1 | 2/2011 | Deng | |
| 2011/0307835 A1 | 12/2011 | Lim et al. | |
| 2012/0256863 A1* | 10/2012 | Zhang et al. | 345/173 |
| 2012/0306788 A1* | 12/2012 | Chen et al. | 345/173 |

FOREIGN PATENT DOCUMENTS

| | | | | |
|---|---|---|---|---|
| CN | 101645856 A | | 2/2010 | |
| CN | 101867646 A | | 10/2010 | |
| CN | 101997783 A | | 3/2011 | |
| CN | WO 2011/079408 A1 | * | 7/2011 | G06F 3/041 |
| CN | 102281352 A | | 12/2011 | |
| JP | 2008242735 A | | 10/2008 | |
| KR | 10-0941948 B1 | | 2/2010 | |
| RU | 2408153 C2 | | 12/2010 | |
| RU | 2417400 C2 | | 4/2011 | |
| WO | WO 2009/151248 A2 | | 12/2009 | |

OTHER PUBLICATIONS

Office Action issued in corresponding Chinese Patent Application No. 201110215318.8, mailed Oct. 26, 2012.

* cited by examiner

METHOD AND TERMINAL OF DISPLAYING CONTACT LIST

CROSS-REFERENCE TO RELATED APPLICATIONS

This application is a continuation of International Application No. PCT/CN2012/070870, filed on Feb. 3, 2012, which claims priority to Chinese Patent Application No. 201110215318.8, filed on Jul. 29, 2011, both of which are hereby incorporated by reference in their entireties.

FIELD OF TECHNOLOGY

The present disclosure relates to communication technologies, and more particularly, to a method and a terminal of displaying contact list.

BACKGROUND

With fast development of information technologies, it is increasingly easier for people to communicate with each other, and the communication methods are increasing as well, for example, to communicate through a cell phone or a fixed phone, to communicate through an electronic mail (email), to communicate through an instant messaging (IM: Instant Messaging) terminal and so on. Because of a variety of reasons, a user will communicate with more and more people, each having different contact manners. Consequently, it is almost an impossible mission for a user to remember all of the contact manners of everyone who communicates with him or her. Thus, in order to reduce memory capacity of a user and be convenient for a user to communicate with others, a conception of contact list is provided.

A contact list is usually maintained by a user himself. Contact information in the contact list includes at least two parts, one being an identifier of a contact recorded by the user, which may be a name, a nickname, a code and so on, the other being contact manner, which may be a telephone number, and/or an email address, and/or a IM account number and so on.

A prior method of displaying a contact list is based on a particular order, such as alphabetic order, Chinese pinyin alphabetic order and so on, to display contacts in the contact list. Due to limitation on the display size of a terminal screen, contacts in the contact list may need several screens to be displayed completely. Consequently, the contact list will be paged to display. If a user wants to find a particular contact, he may have to scroll several pages to find it, which leads to inconvenience for the user and degrades the user's experience.

SUMMARY

The embodiments of the present disclosure provide a method and a terminal of displaying contact list, enabling a user to find a contact quickly and improving the user's experience.

An embodiment of the present disclosure provides a method of displaying contact list which is applied on a terminal having a touch sensitive display and a processor, comprising: detecting a touch on the touch sensitive display, after receiving an instruction for opening a contact list; and determining a touch position, when detecting the touch on the touch sensitive display; determining a large contact group corresponding to the touch position, and displaying contacts in the large contact group by the touch sensitive display.

Another embodiment of the present disclosure provides a terminal having a touch sensitive display and a processor, further comprising: a receiving unit configured to receive an instruction for opening a contact list; a detecting unit configured to detect a touch on the touch sensitive display, after the receiving unit receives an instruction for opening a contact list; and a determining unit configured to determine a touch position, determine a large contact group corresponding to the touch position, and display contacts in the large contact group by the touch sensitive display, when the detecting unit detects the touch on the touch sensitive display.

According to the above solutions provided by the embodiments of the present disclosure, as the embodiments of the present disclosure are applied on a terminal with a touch sensitive display, and contacts in the contact list have been divided into large contact groups previously according to a certain principle, if the contact list needs to be displayed, it is only needed to determine the touch position on the touch sensitive display, and the large contact group corresponding to the touch position may be determined, so as to display the contacts of the large contact group by the touch sensitive display. As different touch positions correspond to different large contact groups, a user may trigger to display the contacts in different large contact groups by touching different positions on the touch sensitive display, which enables the user to find the contacts quickly and improves the user's experience.

BRIEF DESCRIPTION OF THE DRAWINGS

In order to describe the solutions in the embodiments of the present disclosure or the prior art more clearly, a brief introduction on the figures which are needed in the description of the embodiments is given below. Obviously, the figures in the description below are only some embodiments of the present disclosure, based on which other figures can be obtained by those skilled in the art without any inventive efforts.

DETAILED DESCRIPTION OF THE EMBODIMENTS

Solutions in the embodiments of the present disclosure are hereinafter described in detail and completely, with reference to accompanying drawings in the embodiments of the present disclosure. Apparently, the described embodiments are only a part, but not all, of the embodiments of the present disclosure. All of the other embodiments that are obtained by those skilled in the art based on the embodiments in the disclosure without any inventive efforts fall into the scope protected by the present disclosure.

Figure 1:
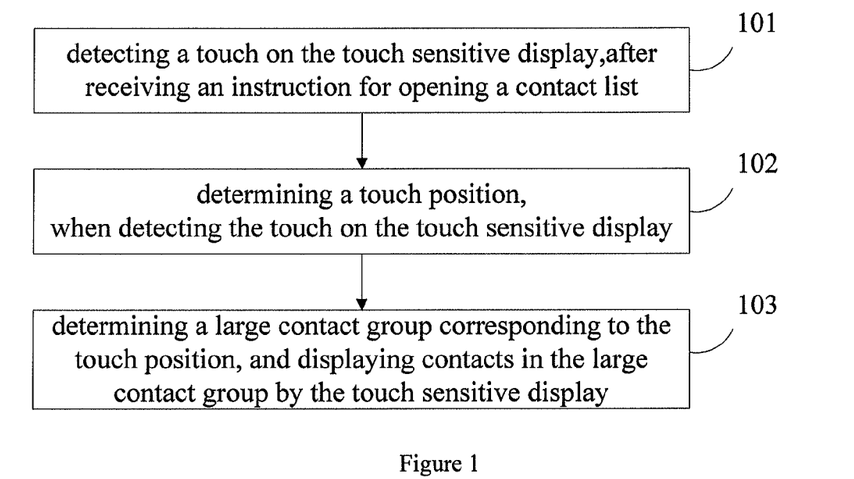
FIG. 1 is a flow chart illustrating a display method of a contact list provided by an embodiment of the present disclosure.

First, a method of displaying contact list provided by an embodiment of the present disclosure will be introduced. The embodiment of the present disclosure provides a terminal with a touch sensitive display, which may be an apparatus with a touch sensitive display, such as a mobile phone, a tablet computer, a personal digital assistant (PDA: Personal Digital Assistant), a laptop and so on. FIG. 1 is a flow chart illustrating a contact list display method provided by an embodiment of the present disclosure, comprising:

101, detecting a touch on the touch sensitive display, after receiving an instruction for opening a contact list.

The instruction for opening the contact list may be sent by a user's operation, for example, by the user clicking a contact list menu, a contact list button and so on.

In particular, touch by finger(s) of the user with the touch sensitive display, touch by a touch pen with the touch sensitive display and so on may be detected.

102, determining a touch position, when detecting the touch on the touch sensitive display.

Each point on the touch sensitive display has a unique coordinate (x, y). Consequently, the coordinate of the touch position may be determined, when the touch on the touch sensitive display is detected.

103. determining a large contact group corresponding to the touch position, and displaying contacts in the large contact group by the touch sensitive display.

The large contact groups may be divided according to different dividing principles, in which for example, contacts may be divided into classmates, colleagues, relatives, friends and so on. Of course, contacts may also be divided according to the first words or the first letters of the contacts. Each large contact group has a corresponding index.

In particular, as the amount of large contact groups is predictable, the display positions of the indices of the large contact groups on the touch sensitive display are preset. Consequently, the correspondence between each large contact group and position on the touch sensitive display may be preset or calculated, so that the large contact group corresponding to the touch position may be determined, after the coordinate of the touch position is determined. For example, the coordinate ranges of the areas corresponding to respective large contact groups may be pre-stored. As a result, after the coordinate of the touch position is acquired, it may be directly determined which of the large contact groups has a corresponding coordinate range contains the coordinate of the touch position, and the large contact group corresponding to the touch position can be determined.

In an embodiment of the present disclosure, on the touch sensitive display, a touch area provided for a user to click and a display area for displaying the contacts may be separate. Therefore, the user clicks different areas within the touch area, while the display area displays contacts corresponding to different large contact groups. In another embodiment of the present disclosure, the touch area may be transparent or semitransparent. As such, the display area may be the whole area of the touch sensitive display. When the touch sensitive display displays contacts in a large contact group, even the contact information is displayed on the display area, it is visible to the user.

When the touch sensitive display displays the contacts, it may display only identifiers of the contacts, or may display both of the identifiers and images of the contacts at the same time. If the user does not set up images for some contacts, a default image may be used. When the touch sensitive display supports multi-touch, if there are so many contacts in a large contact group that the display area cannot display them completely at a time, the user may touch the display area, click a specific position or button to implement page scrolling for the contacts on the display area. Of course, some gestures may be preset, so as to match a touch of a user with the preset gestures when the touch of the user is detected, and therefore perform an operation corresponding to the matched gesture, such as page up, page down and so on.

It can be known from the above that the embodiments of the present disclosure may be applied on a terminal with a touch sensitive display, and contacts in the contact list have been divided into large contact groups previously according to a certain principle. As a result, when it is needed to display the contact list, as long as the touch position on the touch sensitive display is determined, the large contact group in correspondence with the touch position can be determined, so as to display the contacts in the large contact group by the touch sensitive display. As different touch positions corresponds to different large contact groups, the user may trigger to display the contacts in different large contact groups by touching different positions on the touch sensitive display, so that the user can search a contact quickly which improves the user's experience.

For example, when the shape of the touch sensitive display is a rectangle, indices of large contact groups may be placed on at least one side of the four sides of the rectangle. Particularly, in order to satisfy usages of users with various habits, in an embodiment of the present disclosure, a user may set indices of large contact groups to display on which side(s) according to his or her habit. For example, a user who gets used to left hand may set the indices of large contact groups to display on the left side; and a user who gets used to right hand may set the indices of large contact groups to display on the right side. Of course, the indices of large contact groups may also be set on an arc which uses any one angle of the four angles of the rectangle as its center. In order to satisfy usages of users with various habits, in an embodiment of the present disclosure, a user may set the indices of large contact groups to display on an arc using which angle as its center. For example, a user who gets used to left hand may set the indices of large contact groups to display on the arc which uses the left-bottom angle as its center; and a user who gets used to right hand may set the indices of large contact groups to display on the arc which uses the right-bottom angle as its center. It is convenient for the user to operate by one hand and improve the user's experience that the indices of large contact groups are set on the arc which uses the left/right-bottom angle as its center. In order to make it convenient for a user to recognize different large contact groups, the areas where the different large contact groups locate may be set with different colors, or any two adjacent areas where the large contact groups locate may be set with different colors.

Particularly, in an embodiment of the present disclosure, when the indices of large contact groups are set to display on an arc which uses one of the four angels of the rectangle as its center, the determination of the large contact group corresponding to the touch position may comprise determining a degree of an angle made by a datum line and a line joining the touch position and a datum mark, matching the degree of the angle and preset degree ranges of large contact groups, so as to obtain the large contact group corresponding to the touch position. The datum mark may be the point where the center locates, and the datum line may be any one of the two sides of the angle.

In an embodiment of the present disclosure, contacts in the contact list are divided into 27 large contact groups according to the first pinyin letters as the indices. The indices of the 27 large contact groups are A-Z and #, wherein contacts in the "#" are the ones who cannot be divided into the large contact groups corresponding to A-Z, such as those contacts which start with numbers, special signs and so on.

Figure 2:
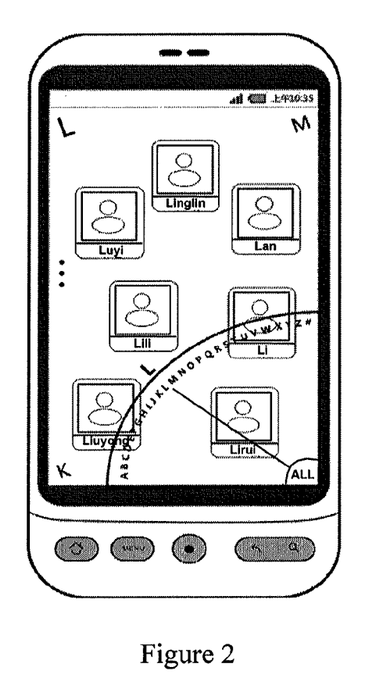
FIG. 2 is a schematic diagram illustrating display of a large contact group provided by an embodiment of the present disclosure.

FIG. 2 illustrates a display instance in which the touch sensitive display is a rectangular, and when the first pinyin letters which are used as the indices are displayed on an arc which uses the right-bottom angle as its center, the large contact group corresponding to "L" corresponds to the touch position. As shown in FIG. 2, contacts in the large contact group corresponding to "L" are Luyi, Linglin, Lan, Lili, Li, Lirui, Liuyong and so on. In an embodiment of the present disclosure, in order for a user to confirm which large contact group is displayed more easily, the currently displayed index of the large contact group may be highlighted, wherein the method of highlight may be to display an enlarged index of the large contact group, to display with different colors, or the like. The embodiments of the present disclosure do not limit the specific methods of highlight. It will not affect the implementations of the present disclosure as long as a user can easily confirm which large contact group is displayed currently. As shown in FIG. 2, L is highlighted.

Figure 3:
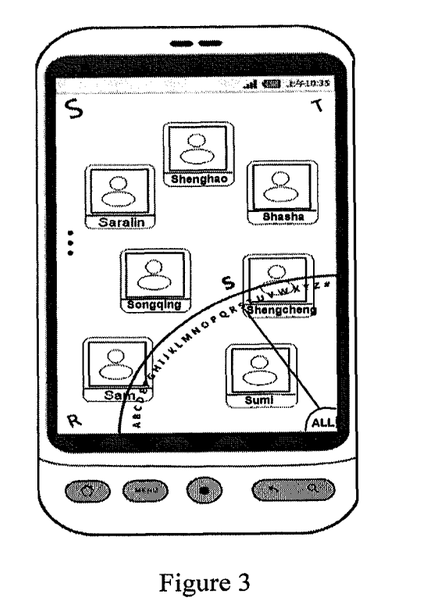
FIG. 3 is a schematic diagram illustrating display of a large contact group provided by another embodiment of the present disclosure.

FIG. 3 illustrates a display instance in which the touch sensitive display is a rectangular, and when the first pinyin letters which are used as the indices are displayed on an arc which uses the right-bottom angle as its center, the large contact group corresponding to the "S" corresponds to the touch position. As shown in FIG. 3, contacts in the large contact group corresponding to the "S" are Saralin, Shenghao, Shasha, Songqing, Shencheng, San, Sumi and so on. In order for a user to confirm which large contact group is displayed more easily, as shown in FIG. 3, S is highlighted.

The case has been described above in which contacts in the contact list are divided into large contact groups in the embodiments of the present disclosure. In another embodiment of the present disclosure, contacts in a large contact group may be further divided into at least two small contact groups after being divided into large contact groups. For example, after the contacts are divided into classmates, colleagues, relatives, friends and other large contact groups, the contacts in the large contact group of classmates can be divided into at least two small contact groups according to the first words or the first letters, or the contacts in the large contact group of classmates may be divided into at least small contact groups according to contact relationship values, such as, being divided as frequently-contacted or infrequently-contacted; or being divided as frequently-contacted, occasionally-contacted and infrequently-contacted. For example, after the contacts are divided into at least two large contact groups according to the first words or the first letters of the contacts, the contacts in each large contact group may be further divided into at least small contact groups according to contact relationship values, such as, being divided as frequently-contacted or infrequently-contacted; or being divided as frequently-contacted, occasionally-contacted and infrequently-contacted, and so on.

When the contacts in the large contact group are divided into at least two small contact groups according to the relationship values of the contacts, the contacts in the large contact group may be divided into small contact groups by the following method: calculating contact relationship values of the contacts in a large contact group; adding the contacts into a corresponding small contact group, according to the contact relationship values and preset ranges of contact relationship values corresponding to the small contact groups. In an embodiment of the present disclosure, contact relationship values of the contacts are obtained by a terminal background performing statistics on communication records. The relationship value of a contact may be determined according to the frequency in which the user communicates with the contact. For example, in an embodiment of the present disclosure, the terminal background will calculate the contact relationship value R in the latest 30 days, and the time frame is the latest 30 days. The factors affecting the contact relationship value R comprise: A=telephone, B=text message, Z=interaction; weights of the respective factors are: A=1, B=0.5, Z=0.5; the calculation time frame is the latest 30 days, wherein the frequency of the latest 10 days takes 70% proportion, and the frequency of the earlier 20 days takes 30% proportion; wherein contact frequency Q10 denotes the average frequency in the latest 10 days, and Q20 denotes the average frequency in the earlier 20 days, and then the frequencies corresponding to the respective factors may be expressed as: Qa10, Qb10, Qz10; Qa20, Qb20, Qz20 respectively. An embodiment of the present disclosure provides a calculation formula for contact relationship value R as given below:

$$R=(A*Qa10+B*Qb10+C*Qz10)*10*0.7+(A*Qa20+B*Qb20+C*Qz20)*20*0.3$$

where $R \geq 0$ and $R \leq 100$. The value 100 is selected when the value of calculated $R > 100$.

Consequently, the large contact group is divided into at least two small contact groups. After determination of the large contact group corresponding to the touch position, an embodiment of the present disclosure further includes determining a small contact group from the large contact group corresponding to the touch position, in which case, display of the contacts in the large contact group by the touch sensitive display includes displaying the contacts in the small contact group of the large contact group by the touch sensitive display.

There are many ways to display the indices of the small contact groups. For example, when the indices of the large contact groups are displayed on the left side or the right side of the touch sensitive display, the indices of the small contact groups may be displayed on the top side or the bottom side of the touch sensitive display. Accordingly, when the indices of the large contact groups are displayed on the top side or the bottom side of the touch sensitive display, the indices of the small contact groups may be displayed on the left side or the right side of the touch sensitive display.

When the indices of the large contact groups are displayed on an arc which uses one of the four angels of the touch sensitive display as its center, the sector which is defined by the indices of the large contact groups and the two sides of the angle may be divided into a sector and at least one sector ring, each sector or sector ring displaying an index of a small contact group. In this case, determination of the small contact group of the large contact group corresponding to the touch position comprises: determining a distance between the touch position and a datum mark, and matching the distance and preset distance ranges of small contact groups, so as to obtain the small contact group in correspondence with the touch position. Areas of different small contact groups may be set with different displaying colors, or any two adjacent areas where the small contact groups locate may be set with different colors, in order for a user to distinguish different small contact groups conveniently.

It may be understood that coordinate ranges of the areas of the respective small contact groups may also be preset. Thus, coordinate of the touch position may be matched with the coordinate ranges of the areas of the respective small contact groups, after determination of the coordinate of the touch position, so as to determine the small contact group corresponding to the touch position.

In an embodiment of the present disclosure, contacts in the contact list are divided into 27 large contact groups according to the indices which are the first letter of pinyin. The indices of the 27 large contact groups are A-Z and #, and contacts in each large contact group are divided into three small contact groups, frequently-contacted, occasionally-contacted and infrequently-contacted according to contact relationship values.

Figure 4:
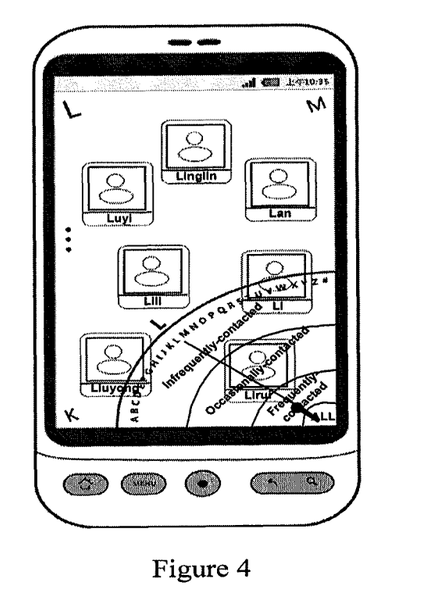
FIG. 4 is a schematic diagram illustrating display of a small contact group provided by an embodiment of the present disclosure.

FIG. 4 illustrates a display instance in which the touch sensitive display is a rectangular, and when the first pinyin letters are displayed as the indices of the large contact group on an arc which uses the right-bottom angle as its center, and the indices of the small contact groups are displayed on a sector or sector ring, the large contact group corresponding to the "L" corresponds to the touch position and the small contact groups corresponds to "frequently-contacted". As shown in FIG. 4, the displayed contacts in the "frequently-contacted" small contact group of the large contact group corresponding to the "L" include Luyi, Linglin, Lan, Lili, Li, Liuyong and Lirui and so on. In order for a user to distinguish different small contact groups, the sector areas corresponding to the small contact groups of "infrequently-contacted", "occasionally-contacted" and "frequently-contacted" may corresponds to different colors, or gray levels, or transparencies and so on, so that the user may locate different small contact groups accurately. There is further an "ALL" area in FIG. 4. If the user clicks this area, only the contacts in the large contact groups will be shown, and no matter these contacts belong to which small contact groups. In order for the user to determine which large contact group is currently displayed more easily, as shown in FIG. 4, L is highlighted. Further, in order for the user to determine which small contact group is currently displayed more easily, the currently displayed small contact group may be highlighted, wherein the method of highlight may be to present a tag in the area of the current small contact group, highlight the area of the current small contact group, or the like. The embodiments of the present disclosure are not limited to the specific methods of highlight. It does not affect the implementations of the present disclosure as long as it enables the user to determine easily which small contact group is displayed currently. As shown in FIG. 4, a tag is presented in the area corresponding to frequently-contacted.

Figure 5:
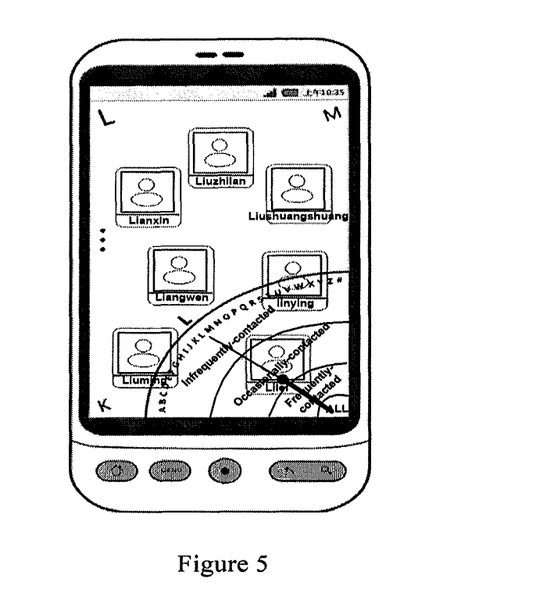
FIG. 5 is a schematic diagram illustrating display of a small contact group provided by another embodiment of the present disclosure.

FIG. 5 illustrates a display instance in which the touch sensitive display is a rectangular, and when the first pinyin letters are displayed as the indices of the large contact group on an arc which uses the right-bottom angle as its center, and the indices of the small contact groups are displayed on a sector or sector ring, the large contact group corresponding to the "L" corresponds to the touch position and the small contact group corresponds to "occasionally-contacted". As shown in FIG. 5, the displayed contacts in the "occasionally-contacted" small contact group of the large contact group corresponding to the "L" include Lianxin, Liuzhilan, Liushuangshuang, Liangwen, Linling, Liuming, Lilei and so on. In order for the user to determine which large contact group is currently displayed more easily, as shown in FIG. 5, L is highlighted. Further, in order for the user to determine which small contact group is currently displayed more easily, as shown in FIG. 5, a tag is presented in the area corresponding to occasionally-contacted.

Figure 6:
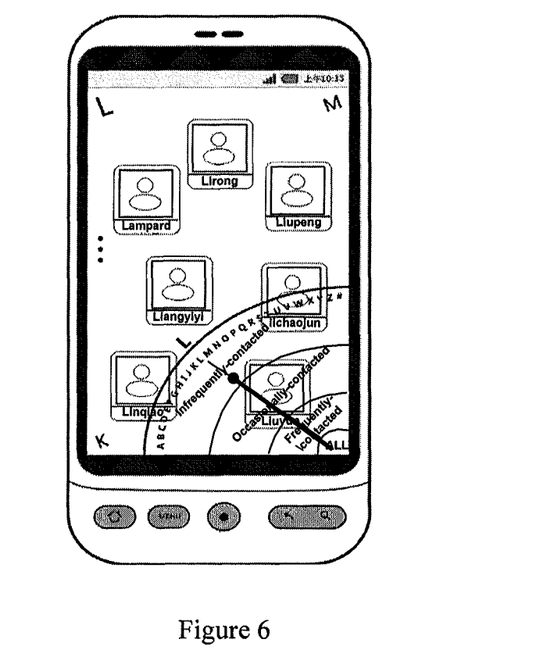
FIG. 6 is a schematic diagram illustrating display of a small contact group provided by another embodiment of the present disclosure.

FIG. 6 illustrates a display instance in which the touch sensitive display is a rectangular, and when the first pinyin letters are displayed as the indices of the large contact group on an arc which uses the right-bottom angle as its center, and the indices of the small contact groups are displayed on a sector or sector ring, the large contact group corresponding to the "L" corresponds to the touch position and the small contact group corresponds to "infrequently-contacted". As shown in FIG. 6, the displayed contacts in the "infrequently-contacted" small contact group of the large contact group corresponding to the "L" include Lampard, Lirong, Liupeng, Liangyiyi, Lichaojun, Linqiao, Liuyun and so on. In order for the user to determine which large contact group is currently displayed more easily, as shown in FIG. 6, L is highlighted. Further, in order for the user to determine which small contact group is currently displayed more easily, as shown in FIG. 6, a tag is presented in the area corresponding to infrequently-contacted.

It should be noted that the preceding method embodiments are described as a combination of a series of motions for simple description. But those skilled in the art should know that the present disclosure is not limited by the described order of the motions. Some steps may be in other orders or be implemented at the same time based on the present disclosure. On the other hand, those skilled in the art should also know that the embodiments described in the specification belong to preferable embodiments, and the motions and modules related thereto are not necessary for the present disclosure.

Figure 7:
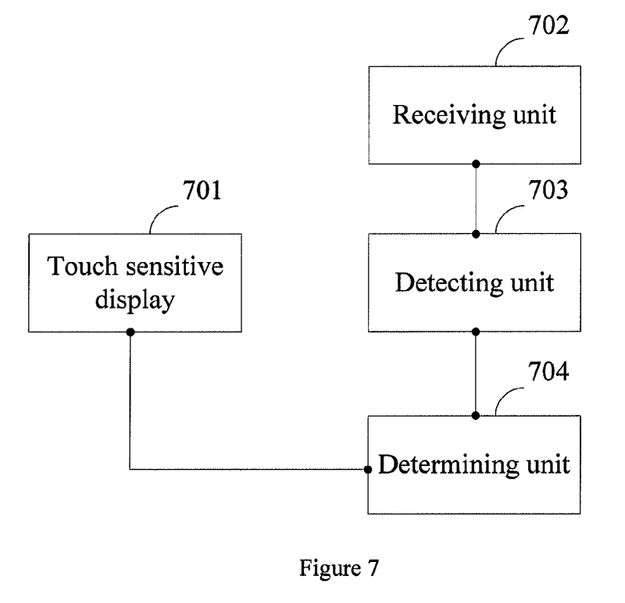
FIG. 7 is a structure schematic diagram illustrating a terminal provided by an embodiment of the present disclosure.

The terminal provided by the embodiments of the present disclosure will be introduced as below. The terminal provided by the embodiments of the present disclosure may be an apparatus with a touch sensitive display, such as a mobile phone, a tablet computer, a PDA, a laptop and so on. FIG. 7 illustrates structure of a terminal provided by an embodiment of the present disclosure. The terminal comprises a touch sensitive display 701;

a receiving unit 702, configured to receive an instruction for opening a contact list;

a detecting unit 703, configured to detect a touch on the touch sensitive display 701, after the receiving unit 702 receives the instruction for opening the contact list; and a determining unit 704, configured to determine a touch position, determine a large contact group corresponding to the touch position, and display contacts in the large contact group by the touch sensitive display 701, when the detecting unit 703 detects the touch on the touch sensitive display 701.

Based on above description, the embodiment provides a terminal with a touch sensitive display. When contacts in the contact list have been divided into large contact groups previously according to a certain principle, if the contact list needs to be displayed, it is only needed to determine the touch position on the touch sensitive display, and the large contact group corresponding to the touch position may be determined, so as to display the contacts of the large contact group by the touch sensitive display. As different touch positions correspond to different large contact groups, a user may trigger to display the contacts in different large contact groups by touching different positions on the touch sensitive display, which enables the user to find the contacts quickly and improves the user's experience.

When the indices of the large contact groups are set to display on an arc which uses one of the four angles of a rectangular as its center, the determining unit 704 may be configured to determine a degree of an angle made by a datum line and a line joining the touch position and a datum mark, match the degree of the angle and preset degree ranges of large contact groups, so as to obtain the large contact group corresponding to the touch position.

In another embodiment of the present disclosure, the large contact group is further divided into at least two small contact groups. In such case, the determining unit 704 may be further configured to determine the small contact group from the large contact group corresponding to the touch position, and display contacts of the small contact group from the large contact group by the touch sensitive display 701.

When the indices of the small contact groups are set to display on a sector or a sector ring, the determining unit 704 is configured to determine a distance between the touch position and a datum mark, match the distance and preset distance ranges of small contact groups, so as to obtain the small contact group corresponding to the touch position.

Figure 8:
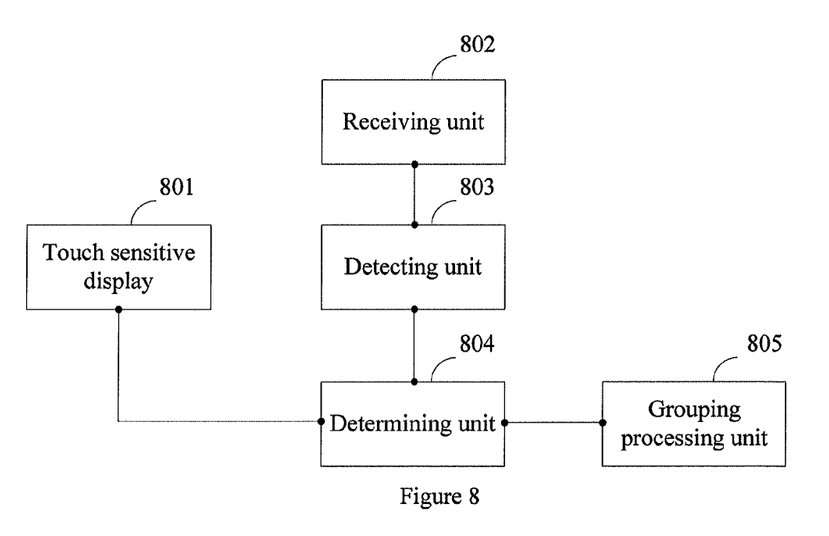
FIG. 8 is a structure schematic diagram illustrating a terminal provided by another embodiment of the present disclosure.

FIG. 8 illustrates a structure of a terminal provided by another embodiment of the present disclosure. The terminal comprises a touch sensitive display 801;

a receiving unit 802, configured to receive an instruction for opening a contact list;

a detecting unit 803, configured to detect a touch for the touch sensitive display 801, after the receiving unit 802 receives the instruction for opening the contact list;

a determining unit 804, configured to determine a touch position, determine a large contact group corresponding to the touch position, and display contacts in the large contact group by the touch sensitive display 801, when the detecting unit 803 detects the touch on the touch sensitive display 801; and a grouping processing unit 805, configured to calculate contact relationship values of the contacts in the large contact group; add the contacts into corresponding small contact groups, according to the contact relationship values and preset contact relationship value ranges corresponding to small contact groups.

The determining unit 804 further configured to determines a small contact group from the large contact group corresponding to the touch position, and display contacts in the small contact group by the touch sensitive display 801, where the small contact group is determined by the grouping processing unit 805 from the large contact group.

Details of information exchange, performed processes and other contents among the respective modules in the above-described apparatuses and systems may be based on the same conception of the method embodiments of the present disclosure, and may refer to the description of the method embodiments of the present disclosure, and therefore will not be described repetitively herein.

It is to be understood to those skilled in the art that the implementation of all or parts of the process in the method embodiments may be done through a computer program to instruct relevant hardware. The above-described program may be stored in a computer readable medium. The program may include the processes of the respective method embodiments when being executed. The above-described storage medium may be a magnetic disk, an optical disk, a Read-Only Memory (ROM: Read-Only Memory), a Random Access Memory (RAM: Random Access Memory) or the like.

The description uses specific examples to explain the principle and the implementations of the present disclosure. The explanation of above embodiments is only to help understanding the methods and thoughts of the present disclosure. Meanwhile, according to the present disclosure, changes may be made in detailed implementations and applicable ranges as for those skilled in the art. To sum up, the contents of the description should not be understood as limitation to the present disclosure.

What is claimed is:

1. A method of displaying contact list on a terminal having a touch sensitive display and a processor, comprising:

Detecting a touch on the touch sensitive display, after receiving an instruction for opening a contact list;

Determining a touch position, when detecting the touch on the touch sensitive display; and Determining a large contact group corresponding to the touch position, and displaying contacts in the large contact group by the touch sensitive display, Wherein the determining the large contact group corresponding to the touch position comprises:

determining a degree of an angle made by a datum line and a line joining the touch position and a datum mark, wherein indices of large contact groups are set to display on an arc which uses one of four corners of a rectangle of the touch sensitive display as a center of the arc, the datum mark being a point where the center locates, and the datum line being any one of two sides of the corner which is used as the center of the arc; and, Matching the degree of the angle and preset degree ranges of the large contact groups, so as to obtain the large contact group corresponding to the touch position Wherein contacts in the large contact group are divided into at least two small contact groups, Wherein after determining the large contact group corresponding to the touch position, the method further comprises:

Determining a small contact group from the large contact group in correspondence with the touch position, and Wherein displaying contacts in the large contact group by the touch sensitive display comprises: displaying contacts in the small contact group by the touch sensitive display Wherein determining the small contact group from the large contact group in correspondence with the touch position comprises:

Determining a distance between the touch position and the datum mark;

Matching the distance and preset distance ranges of small contact groups, so as to obtain the small contact group in correspondence with the touch position.

2. The method of claim 1, wherein the contacts in the large contact group are divided into at least two small contact groups by calculating contact relationship values of contacts in the large contact group; and adding the contacts into corresponding small contact groups according to the contact relationship values and preset ranges of contact relationship values corresponding to small contact groups.

3. a terminal having a touch sensitive display and a processor, further comprising:

A receiving unit, configured to receive an instruction for opening a contact list; A detecting unit, configured to detect a touch on the touch sensitive display, after the receiving unit receives the instruction for opening the contact list; and a determining unit, configured to determine a touch position, determine a large contact group corresponding to the touch position, and display contacts in the large contact group by the touch sensitive display, when the detecting unit detects the touch on the touch sensitive display, wherein the determining unit is configured to determine a degree of an angle made by a datum line and a line joining the touch position and a datum mark, wherein indices of large contact groups are set to display on an arc which uses one of four corners of a rectangle of the touch sensitive display as a center of the arc, the datum mark being a point where the center locates, and the datum line being any one of two sides of the corner which is used as the center of the arc, and match the degree of the angle and preset degree ranges of the large contact groups, so as to obtain the large contact group corresponding to the touch position Wherein contacts in the large contact group are divided into at least two small contact groups;

The determining unit is further configured to determine a small contact group from the large contact group corresponding to the touch position, and display contacts of the small contact group from the large contact group by the touch sensitive display Wherein the determining unit is configured to determine a distance between the touch position and the datum mark, and match the distance and preset distance ranges of small contact groups, so as to obtain the small contact group corresponding to the touch position.

4. The terminal of claim 3, further comprising a grouping processing unit, configured to calculate contact relationship values of contacts in the large contact group, and add the contacts into corresponding small contact groups according to the contact relationship values and preset ranges of contact relationship values corresponding to small contact groups; and wherein The determining unit is configured to determine a small contact group from the large contact group corresponding to a touch position, and display contacts in the small contact group by the touch sensitive display, wherein the small contact group is determined by the grouping processing unit from the large contact group.

* * * * *